March 28, 1967 B. E. BOSER ETAL 3,310,911
FLOWER POT SUPPORTING ATTACHMENT FOR CEMETERY MONUMENTS
Filed Jan. 7, 1965 2 Sheets-Sheet 1

Bernard E. Boser
James A. Mares
INVENTORS

March 28, 1967  B. E. BOSER ETAL  3,310,911
FLOWER POT SUPPORTING ATTACHMENT FOR CEMETERY MONUMENTS
Filed Jan. 7, 1965  2 Sheets-Sheet 2

Bernard E. Boser
James A. Mares
INVENTORS

BY Clarence A. O'Brien
and Harvey B. Jacobson
Attorneys

United States Patent Office 3,310,911
Patented Mar. 28, 1967

3,310,911
FLOWER POT SUPPORTING ATTACHMENT FOR CEMETERY MONUMENTS
Bernard E. Boser, 102 5th Ave. SE., Little Falls, Minn. 56345, and James A. Mares, Cushing, Minn. (RFD 3, Box 17, Wadena, Minn. 56482)
Filed Jan. 7, 1965, Ser. No. 424,039
2 Claims. (Cl. 47—39)

This invention generally relates to new and useful improvements in flower pot holders for use particularly although not necessarily, in cemeteries and has for its primary object to provide, in a manner as hereinafter set forth, novel means for firmly supporting and attractively displaying a pair of flower pots at any desired elevation on a conventional cemetery headstone or monument.

Another highly important object of the present invention is to provide a potted flower holder of the character described which is readily adjustable for mounting on headstones or monuments of various dimensions.

Still another important object of the invention is to provide an improved holder of the aforementioned character which will not damage the headstone or monument and which, further, will be inconspicuous when mounted thereon.

Other objects are to provide an improved flower pot holder which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
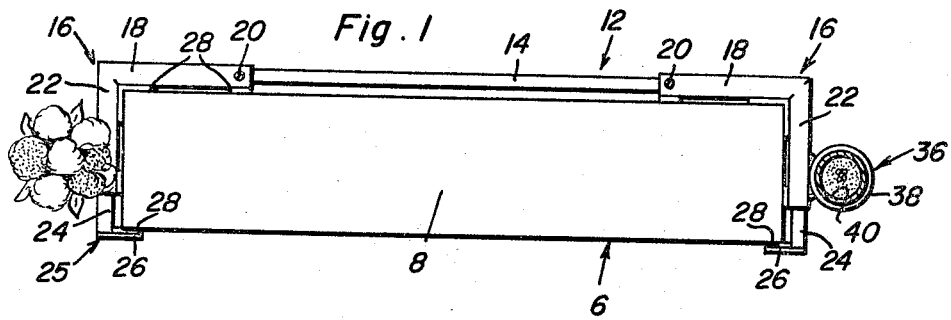
FIGURE 1 is a top plan view of a headstone or monument having mounted thereon a holder embodying the present invention.
Figure 2:
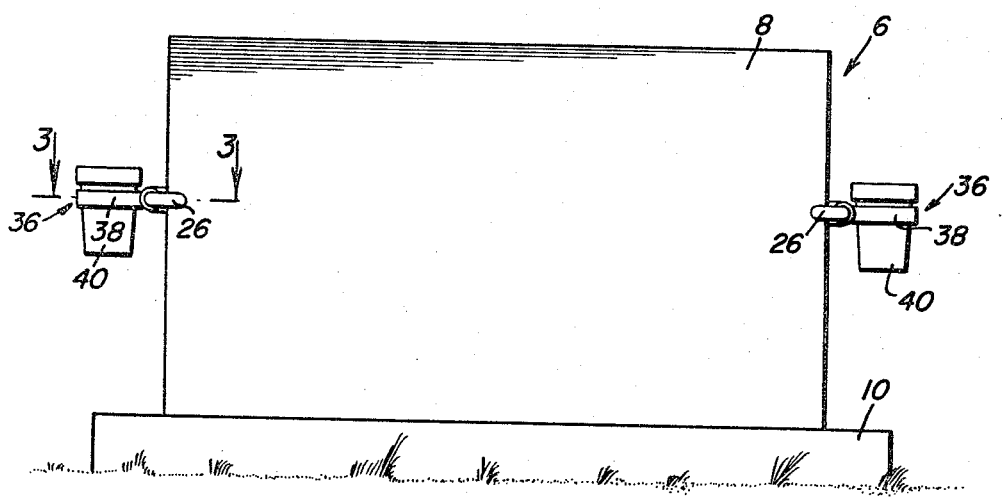
FIGURE 2 is a view in front elevation thereof.
Figure 3:
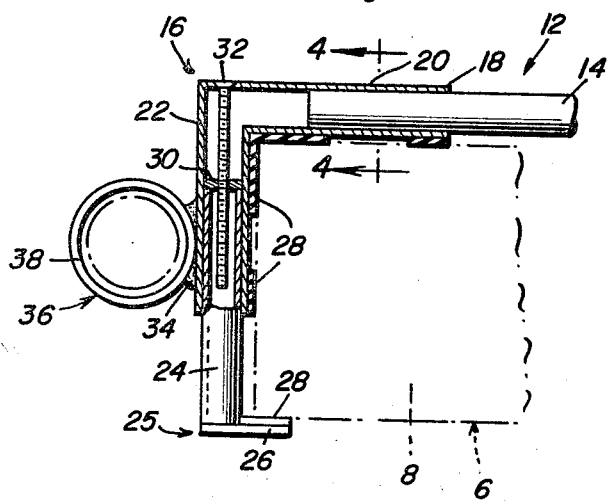
FIGURE 3 is a view in horizontal section on an enlarged scale through an end portion of the device, taken substantially on the line 3—3 of FIGURE 2.

Referring now to the drawing in detail, it will be seen that reference numeral 6 designates a conventional cemetery headstone or monument. The headstone 6 comprises the usual vertical slab 8 mounted on a base or foundation 10.

The embodiment of the present invention which has been illustrated comprises a substantially U-shaped, transversely elongated frame which is generally designated by reference numeral 12. The frame 12 is adapted to be mounted on the headstone 6 from the rear thereof and clamped by friction in adjusted position thereon. Toward this end, the frame 12 includes a back rod 14 which extends transversely across the rear of the stone 6. Telescopically mounted for sliding adjustment on the end portions of the rod or shaft 14 is a pair of angulated tubes or elbows 16. The legs 18 of the elbows 16 are secured in adjusted position on the end portions of the rod or shaft 14 by setscrews 20. The legs 22 of the elbows 16 receive the headstone 6 therebetween and are clampingly engaged therewith.

The frame assembly 12 further includes tubular extensions or members 24 which are telescopically mounted for sliding adjustment in the legs 22 of the elbows 16. The tubular members or extensions 24 are provided on their forward or free ends with inturned jaws or the like 26 which are engageable with the front or face of the headstone 6. The faces of the jaws 26 and the inner surfaces of the legs 18 and 22 of the elbows 16 are provided with protective pads 28 of suitable material. The tubular members or extensions 24 comprise closed rear or inner ends 30. Flat-headed countersunk screws 32 are rotatably anchored in the legs 18 of the elbows 16 and threaded through the inner end walls 30 of the members 24 for adjusting said members with the jaws 26 thereon.

Rigidly mounted by soldering or welding, as indicated at 34 on the legs 22 of the elbows 16 are annular brackets 36 in the form of horizontal rings 38 of suitable metal. The horizontally projecting rings 38 are for the reception of conventional flower pots, as indicated at 40.

Figure 4:
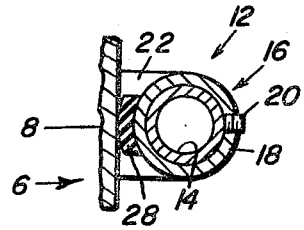
FIGURE 4 is a cross-sectional view on an enlarged scale, taken substantially on the line 4—4 of FIGURE 3.
Figure 5:
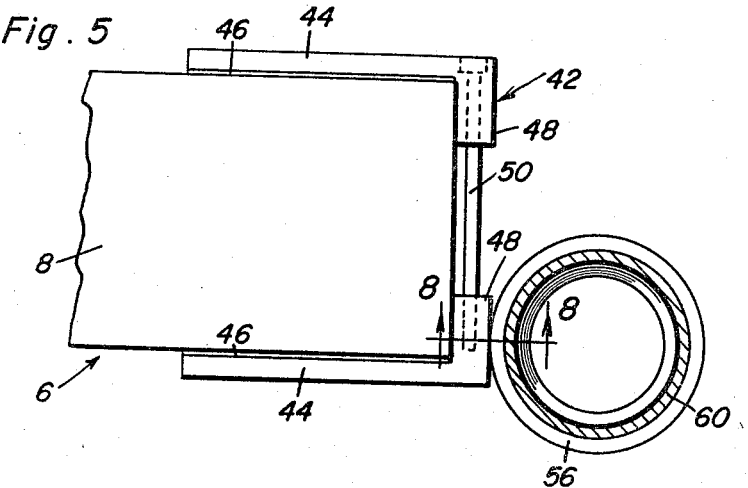
FIGURE 5 is a top plan view, showing a modified form of the invention mounted on a headstone or monument.
Figure 6:
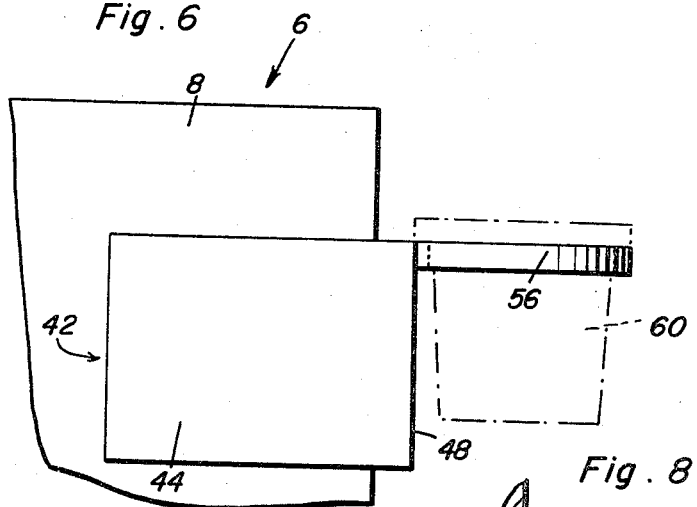
FIGURE 6 is a view in front elevation of the modification of FIGURE 5.
Figure 8:
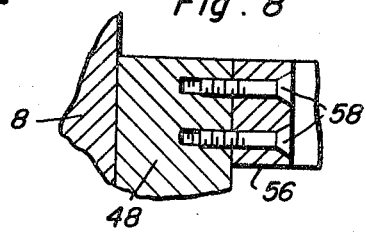
FIGURE 8 is a fragmentary view in vertical section on an enlarged scale, taken substantially on the line 8—8 of FIGURE 5.

It is thought that the use of the holder will be readily apparent from a consideration of the foregoing. Briefly, the frame assembly 12 is positioned on the headstone 6 and the elbows 16 are adjusted inwardly on the rod or shaft 14 and secured by the setscrews 20. When thus positioned and secured the elbows 16 are clampingly engaged with the headstone. Then, the assembly is further secured by tightening the jaws 26 against the front or face of the headstone through the medium of the screws 32. Thus, the members 16, 24, 28, 32, etc., constitute clamps 25 which grip the vertical marginal side portions of the headstone 6. The potted flowers may then be mounted in the horizontal rings 38 in an obvious manner. Of course, the pots 40 are tapered and seat by gravity in the rings 38. As shown to advantage in FIGURE 4 of the drawing, the member 14 is also tubular and said member may be of any suitable metal or other material. It will be noted that the construction and arrangement is such that the frame assembly 12 may be readily adjusted for mounting on headstones of various widths and thicknesses. It also will be observed that the device is inconspicuous or substantially concealed when the headstone or monument, as usual, is viewed from the front.

In the modification of FIGURES 5, 6, 7 and 8 of the drawing, reference numeral 42 generally designates a clamp of suitable metal or other material removably and adjustably mounted on one side portion of the slab 8. Preferably, one of the devices is mounted on each side of the monument. The clamp 42, in the embodiment shown, comprises a pair of coacting angulated jaws, elbows or the like 44 in the form of plates which are adapted to receive and grip the slab 8 therebetween. Protective pads or the like 46 are provided on the jaws 44. The inwardly extending end portions 48 of the jaws 44 are adapted to abut the side of the slab 8.

Figure 7:
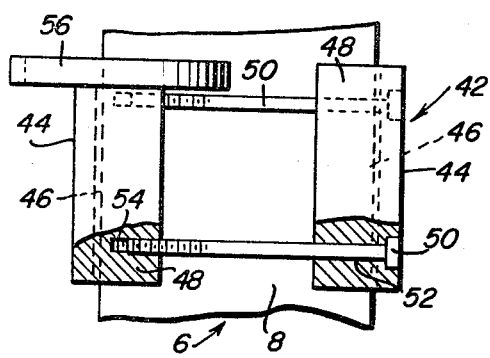
FIGURE 7 is a side elevational view of the modification with portions broken away in sections.

As shown to advantage in FIGURE 7 of the drawing, countersunk headed screws or fasteners 50 are mounted in openings 52 provided therefor in the inner end portion of one of the jaws 44. The threaded end portions of the screws 50 are received by threaded bores or sockets 54 provided therefor in the end portion 48 of the other jaw 44.

Mounted horizontally on the end portion 48 of one of the jaws 44 is a laterally projecting ring 56 of suitable metal or other material. Countersunk screws 58 (FIGURE 8) rigidly secure the ring 56 in position. The ring 56 seatingly receives a conventional tapered flower pot, as indicated at 60.

In use, a pair of the clamps 42 are frictionally secured in a desired position on the vertical side portions of the slab 8. Of course, the jaws 44 are closed on the slab 8 by tightening the screws 50. It will be observed that the construction and arrangement is such that the clamps 42 will accommodate slabs of various thicknesses within a given range.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a headstone of the type including a pair of generally parallel upstanding opposite sides interconnected at one pair of corresponding ends by means of a third upstanding side, a flower pot holder comprising a generally U-shaped horizontal frame including a pair of generally parallel jaws interconnected at one pair of corresponding ends by means of a bight portion extending therebetween, said one pair of ends of said jaws including right angled end portions projecting toward each other at their inner ends, said inner ends being axially aligned and spaced axially apart, said bight portion extending between and being telescopingly engaged with said end portions and being adjustable in effective length whereby the distance between said jaws may be varied as desired so as to adapt said holder to clampingly embrace said headstone therebetween with said jaws engaging said opposite sides and said right angled end portions and said bight portion extending along said third side, said jaws including resilient pad means on the opposing surfaces thereof for non-marring engagement with said opposite sides of said headstone, said jaws being of minimal width in the direction of a line extending between said jaws, said holder including means adapted to support a flower container therefrom, the outer ends of said jaws including laterally directed end members projecting toward each other, said headstone including a fourth side extending between the other pair of corresponding ends of said opposite sides thereof, said end members, when said flower pot holder is mounted on a headstone, being adapted to overlie the corresponding end portions of said fourth side, said jaws being adjustable in effective length from said end portions to said end members whereby said holder is also adapted to clampingly engage said headstone between said end portions and said end members, said jaws each comprising a pair of telescopically engaged tubular members, said right angled end portions being carried by the ends of one pair of corresponding tubular members remote from the other pair of corresponding tubular members and said end members being carried by the corresponding ends of the other pair of tubular members remote from said right angled end portions.

2. The combination of claim 1 wherein each pair of telescopically engaged tubular members includes an axial thrust member comprising a threaded screw member rotatably journaled from one of said tubular members and threadedly engaged with the other of said tubular members.

References Cited by the Examiner

UNITED STATES PATENTS

| D. 90,966 | 11/1933 | Bach. | |
|-----------|---------|-------|---|
| 1,074,239 | 9/1913 | Braun. | |
| 1,352,895 | 9/1920 | Hoffman | 248—72 |
| 1,778,700 | 10/1930 | Whittier et al. | 248—72 |
| 2,214,302 | 9/1940 | Keller et al. | 248—226 X |
| 2,782,847 | 2/1957 | Terauchi | 248—226 X |
| 3,145,847 | 8/1964 | Clement | 248—27.8 X |

FOREIGN PATENTS

| 968,691 | 9/1964 | Great Britain. |

ABRAHAM G. STONE, *Primary Examiner.*

P. A. RAZZANO, *Assistant Examiner.*